(12) United States Patent
Kamboh et al.

(10) Patent No.: US 9,215,329 B2
(45) Date of Patent: *Dec. 15, 2015

(54) EMERGENCY SERVICES ROUTING PROXY CLUSTER MANAGEMENT

(71) Applicant: Airbus DS Communications, Inc., Temecula, CA (US)

(72) Inventors: Ameel Kamboh, Murrieta, CA (US); Jason Wellonen, Temecula, CA (US)

(73) Assignee: Airbus DS Communications, Inc., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,781

(22) Filed: Dec. 19, 2014

(65) Prior Publication Data

US 2015/0229775 A1    Aug. 13, 2015

Related U.S. Application Data

(63) Continuation of application No. 14/175,872, filed on Feb. 7, 2014, now Pat. No. 8,929,856.

(51) Int. Cl.
*H04M 11/00* (2006.01)
*H04M 11/04* (2006.01)

(52) U.S. Cl.
CPC .................................... *H04M 11/04* (2013.01)

(58) Field of Classification Search
None
See application file for complete search history.

(56) References Cited

U.S. PATENT DOCUMENTS

| | | | |
|---|---|---|---|
| 5,646,987 | A | 7/1997 | Gerber et al. |
| 6,600,812 | B1 | 7/2003 | Gentillin et al. |
| 6,609,213 | B1 | 8/2003 | Nguyen et al. |
| 7,813,335 | B2 | 10/2010 | Terpstra et al. |
| 2004/0049573 | A1 | 3/2004 | Olmstead et al. |

(Continued)

FOREIGN PATENT DOCUMENTS

CN       102 611 809       7/2012

OTHER PUBLICATIONS

"$3^{rd}$ Generation Partnership Project; Technical Specification Group Services and System Aspects; Policy and charging control architecture (Release 11)." 3GPP Standard; 3GPP TS 23.203, $3^{rd}$ Generation Partnership Project (3GPP), Mobile Competence Centre; 650; Route Des Lucioles; F-06921 Sophia-Antipolis Cedex; France; No. V11.1.0, Mar. 17, 2011, pp. 1-136.

(Continued)

*Primary Examiner* — Maria El-Zoobi
(74) *Attorney, Agent, or Firm* — Knobbe Martens Olson & Bear LLP

(57) ABSTRACT

Systems and methods for clustering emergency services routing proxies are provided. The described features allow a group of ESRPs running as individual servers or a group of virtual servers, to be referenced using a single URI. In one implementation, an emergency services routing proxy device includes an emergency services routing proxy node configured to route a call to a downstream entity, the call received from an upstream entity. The device further includes a cluster manager configured to receive registration information from the emergency services routing proxy node, the registration information including a routing service identifier. The cluster manager may be further configured to identify the emergency services routing proxy node for call routing based on a comparison of an identifier included in the call with the routing service identifier.

19 Claims, 7 Drawing Sheets

(56) References Cited

U.S. PATENT DOCUMENTS

| | | | |
|---|---|---|---|
| 2005/0157707 | A1 | 7/2005 | Sternagle |
| 2005/0213716 | A1 | 9/2005 | Zhu et al. |
| 2006/0120517 | A1 | 6/2006 | Moon et al. |
| 2007/0043726 | A1* | 2/2007 | Chan et al. .................. 707/9 |
| 2007/0280430 | A1* | 12/2007 | He .................. 379/37 |
| 2008/0056244 | A1* | 3/2008 | Terpstra et al. .................. 370/353 |
| 2009/0054029 | A1* | 2/2009 | Hogberg et al. .................. 455/404.2 |
| 2009/0157419 | A1 | 6/2009 | Bursey |
| 2009/0191841 | A1 | 7/2009 | Edge et al. |
| 2009/0280770 | A1 | 11/2009 | Mahendran |
| 2009/0291663 | A1 | 11/2009 | Schultz et al. |
| 2010/0145861 | A1 | 6/2010 | Law et al. |
| 2010/0198985 | A1 | 8/2010 | Kanevsky et al. |
| 2010/0202368 | A1 | 8/2010 | Hans |
| 2010/0246780 | A1* | 9/2010 | Bakker et al. .................. 379/38 |
| 2011/0064205 | A1 | 3/2011 | Boni et al. |
| 2011/0110364 | A1 | 5/2011 | Fried et al. |
| 2011/0134897 | A1 | 6/2011 | Montemurro et al. |
| 2012/0015623 | A1* | 1/2012 | Bakker et al. .................. 455/404.2 |
| 2012/0166866 | A1 | 6/2012 | Rao et al. |
| 2012/0307989 | A1 | 12/2012 | Hawley et al. |
| 2012/0320912 | A1* | 12/2012 | Estrada et al. .................. 370/389 |

OTHER PUBLICATIONS

The Avaya Aura ESRP updated brochure SVC5306. http://www.avaya.com/uk/resource/assets/brochures/Avaya%20Aura%20ESRP%20updated%20brochure%20SVC5306.pdf. Jun. 2010.

Cassidian: "Aurora: Management Information System for Next Generation 911 Solutions." Retrieved from the Internet: URL:http://www.cassidiancommunications.com/911-call-processing/911-public-safety.php [retrieved on Sep. 14, 2012].

International Search Report for International Application No. PCT/US2012/042995 dated Jan. 23, 2013.

International Search Report for International Application No. PCT/US13/65640 dated Apr. 29, 2014.

International Search Report for International Application No. PCT/US2014/057015 dated Dec. 9, 2014.

Invitation to Pay Additional Fees for International Application No. PCT/US2012/042995 dated Sep. 26, 2012.

Mintz-Habib M. et al. "A VoIP emergency services architecture and prototype." Computer Communications and Networks. 2005. ICCCN 2005. Proceedings. $14^{th}$ International Conference. San Diego, CA, USA. Oct. 17-19, 2005. Piscataway, NJ, USA. pp. 523-528.

Natarajan S et al. "Distributed visual analytics for collaborative emergency response management." Proceedings of the $31^{st}$ Annual International Conference of the IEEE Engineering in Medicine and Biology Society: Engineering the Future of Biomedicine, EMBC 2009, Sep. 3, 2009, pp. 1714-1717.

Schulzrinne et al. The Internet Engineering Task Force RFC5012 entitled "Requirements for Emergency Context Resolution with Internet Technologies" published in Jan. 2008. http://www.ietf.org/rfc/rfc5012.txt.

\* cited by examiner

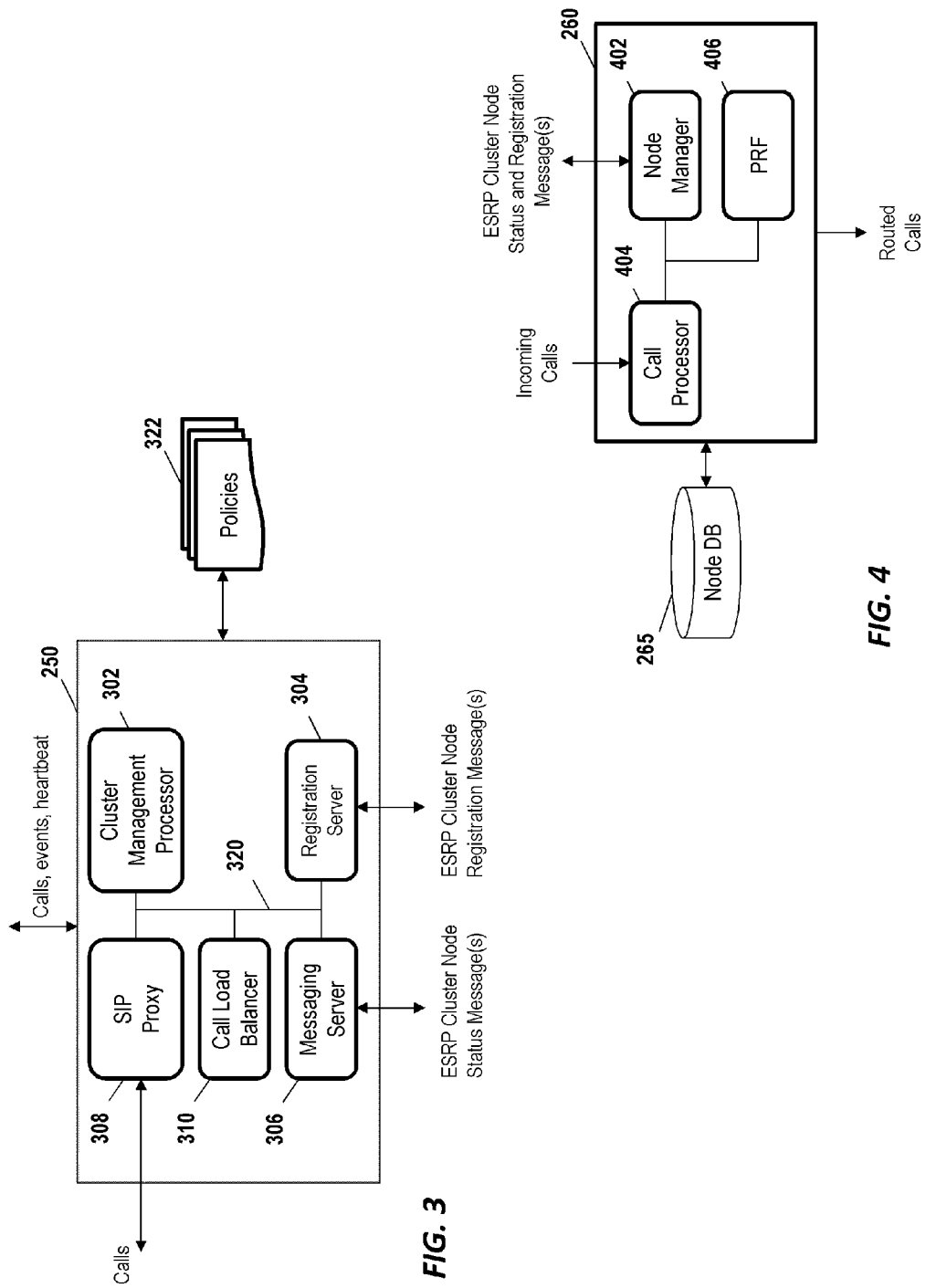

EMERGENCY SERVICES ROUTING PROXY CLUSTER MANAGEMENT

CROSS-REFERENCE TO RELATED APPLICATIONS

This application is a continuation of U.S. patent application Ser. No. 14/175,872, filed on Feb. 7, 2014 which is incorporated by reference in its entirety. Furthermore, any and all priority claims identified in the Application Data Sheet, or any correction thereto, are hereby incorporated by reference under 37 C.F.R. §1.57.

FIELD

The present development relates generally to emergency services routing proxies (ESRPs), and more specifically to systems and methods for clustering emergency services routing proxies.

BACKGROUND

Users of both voice-centric (telephone-like) and non-voice services, such as text communication for hearing-disabled users, expect to be able to initiate a request for help in case of an emergency. Unfortunately, the existing mechanisms to support emergency calls that have evolved within the public circuit-switched telephone network (PSTN) are not appropriate to handle evolving IP-based voice, text, and real-time multimedia communications. It is desirable to provide emergency call services which, at a minimum, offer the same functionality as existing PSTN services, with the additional non-limiting benefit of making emergency calling more robust, less costly to implement, and multimedia-capable. An IP-based end system and network element included in the system are described in The Internet Engineering Task Force RFC5012 entitled "Requirements for Emergency Context Resolution with Internet Technologies" published in January 2008.

Call routing entities are included in the IP-based system. The IP-based system is sometimes referred to as Emergency Services IP Network or ESInet. A call may be received from a source device (e.g., smartphone, telephone, computer, etc.) and eventually routed to an emergency services operator. One call routing entity is the Emergency Service Routing Proxy (ESRP). An ESRP is an emergency call routing support entity that may invoke the location-to-public service answering point (PSAP) URI mapping function. Due in part to the distributed nature of the evolving communications networks, a key feature for an emergency call is routing the call to an answering point that can provide emergency assistance to the location of the emergency. The ESRP plays an integral role in receiving a call and mapping the call to an appropriate PSAP URI or to the URI for another ESRP where subsequent mapping is performed. Call mapping may also be performed by other entities, including entities that instantiate the session initiation protocol (SIP) proxy role and the SIP user agent client role.

An ESRP may be selected for call routing based on location information included in the call. When the call is received by the ESRP, an emergency call routing function (ECRF) may be queried by the ESRP to identify the next hop for the call. In some implementations, a location information service (LIS) may be included to assist in generating or enhancing the location information for a call. To ensure routing to the entity responsible for the location of the call, location information may be updated (e.g., via LIS) just prior to querying the ECRF to ensure the most recent location information is used as the basis for the hop identification. This process may be repeated for several ESRPs until the final hop identified is a PSAP. In current implementations, each ESRP is an individual server identified using a single URI.

The clustering of the policy and routing function for an emergency call once received at an answering point has been described in U.S. patent application Ser. No. 14/058,049 entitled "Clustered Session Management." In the present application, the ESRP is configured to determine which answering point should receive the call.

The routing and performance of an ESInet may be limited by the performance and scalability of the ESRP and the processing functions of the ESRP. Although routing and policies are put in place for distributing the calls across the network, the ESRP is still bound by the physical limits of its underlying infrastructure. This can cause calls to be routed inappropriately to destinations due to these limits. Latency in the ESRP can cause degraded service to users due to routing decisions based on upstream policies even if there are agents and handling capabilities in the PSAP calls may be redirected due to performance limitations of the ESRP.

As discussed, a call may be routed via a chain of two or more ESRPs. In such instances, the issues of performance and scalability may be experienced most severely in the terminating ESRP which generally refers to the ESRP at the end of the chain. For example, the terminating ESRP incurs the processing overhead of its predecessor ESRP(s) such as agent logic and control functions applied as the call winds its way through the system.

Ensuring the efficient and fault tolerant of the routing of calls to a PSAP can, particularly in emergency situations, make the difference between life and death.

SUMMARY

The systems, methods, and devices of the disclosure each have several innovative aspects, no single one of which is solely responsible for the desirable attributes disclosed herein.

In one innovative aspect, an emergency services routing proxy device is provided. The device includes a first emergency services routing proxy node and a second emergency services routing proxy node. The nodes are configured to route calls to a downstream entity, the calls received from an upstream entity. The device also includes a cluster manager. The cluster manager is configured to receive first registration information from the first emergency services routing proxy node, the first registration information including a routing service identifier. The cluster manager is further configured to receive second registration information from the second emergency services routing proxy node, the second registration information including the routing service identifier. The cluster manager is further configured to provide a service status message for a routing service associated with the routing service identifier. The cluster manager is further configured to identify the first emergency services routing proxy node or the second emergency services routing proxy node to provide the routing service for a call. The identification is based on an identifier included in the call, the first registration information, and the second registration information.

In some implementations, the downstream entity includes at least one of another emergency services routing proxy node or a public safety answering point. The call may be a session initiation protocol call. The routing service identifier and the identifier included in the call may include a uniform resource identifier (URI). In some implementations, the upstream entity includes at least one of a call originating device or another emergency services routing proxy.

The device may, in some implementations, include a load balancer configured to identify a node based on a load balancing policy. The cluster manager may be further configured to identify one of the emergency services routing proxy node for call routing via the load balancer.

The device may, in some implementations, include a first database server associated with the emergency services routing proxy node, the first database server including routing policy data. The device may include a second database server associated with the second emergency services routing proxy node, the second database server including the routing policy data. The first database server and the second database server may be configured to replicate routing policy data such that the routing policy data included in database servers is identical.

In some implementations, providing the service status message includes receiving node status information from nodes associated with the routing service identifier, generating the service status message based on the received node status information and a status policy, and transmitting the service status message to the upstream entity. The node status information may include at least one of node load, a number of active calls for the node, node memory usage, node network bandwidth, node temperature, message queue state, preferences, and node routing time. The status policy may associate a service status with aggregated node status information values. The service status message can include the service status.

The device may, in some implementations, include a first manager database server configured to store the registration information, a second cluster manager, and a second manager database server associated with the second cluster manager and configured to store the registration information. The first manager database server and the second manager database server may be configured for mutual replication. The second cluster manager may be configured to replace the cluster manager upon detecting a failure of the cluster manager.

In another innovative aspect, a method of emergency services call routing is provided. The method includes receiving, at an electronic device including a cluster management processor, first registration information from a first emergency services routing proxy node, the first registration information including a routing service identifier. The method includes receiving second registration information from a second emergency service routing proxy node, the second registration information including the routing service identifier. The method further includes providing a service status message for a routing service associated with the routing service identifier. The method also includes receiving a call including a service identifier. The method further includes identifying the first emergency services routing proxy node or the second emergency services proxy node to provide the routing service for the call. The identification is based on the service identifier included in the call, the first registration information, and the second registration information.

The method may include providing the call to the identified emergency services routing proxy node. One example of the call is a session initiation protocol call. An example of a routing service identifier is a uniform resource identifier (URI).

In some implementations, identifying an emergency services routing proxy node includes receiving a load balancing policy, receiving node information from the emergency services routing proxy nodes, and identifying an emergency services routing proxy nodes further based on the load balancing policy and the received node information.

The method may, in some implementations, include receiving node status information from nodes associated with the routing service identifier. The nodes associated with the routing service identifier including the first and second emergency services routing proxy nodes. The method may include generating a service status message based on the received node status information and a status policy and transmitting the service status message to an upstream entity.

A first routing service identifier may be received from the first emergency services routing proxy node. The first routing service identifier may be associated with a first tenant of the first emergency services routing proxy node. A second routing service identifier may be received from the first emergency services routing proxy node, the second routing service identifier associated with a second tenant of the first emergency services routing proxy node.

The method may be included, in some implementations, redundantly storing the registration information in a first database server associated with a first instance of the cluster manager processor and in a second database server associated with a second instance of the cluster manager processor.

Emergency services routing nodes associated with the routing service identifier included in the method may each be configured to route the call to the same downstream entity.

In one innovative aspect, a non-transitory computer readable medium is provided. The medium includes instructions executable by a processor of an apparatus. The instructions cause the apparatus to perform, in whole or in part, the innovative method described above.

In yet another innovative aspect, an emergency services routing proxy device is provided. The device includes a plurality of means for routing calls to a downstream entity, the calls received from an upstream entity. The device includes means for receiving registration information from the plurality of means for routing calls. Registration information for a first means for routing calls includes a routing service identifier and registration information for a second means for routing calls includes the routing service identifier. The device further includes means for providing a service status message for a routing service associated with the routing service identifier. The device also includes means for identifying one of the plurality of means for routing calls to provide the routing service for a call, the identifying based a service identifier included in the call and the registration information received from the plurality of means for routing calls.

BRIEF DESCRIPTION OF THE DRAWINGS

FIG. 3 shows a functional block diagram for an example cluster manager.

FIG. 4 shows a functional block diagram of an example ESRP cluster node.

DETAILED DESCRIPTION OF EXEMPLARY EMBODIMENTS

Figure 1:
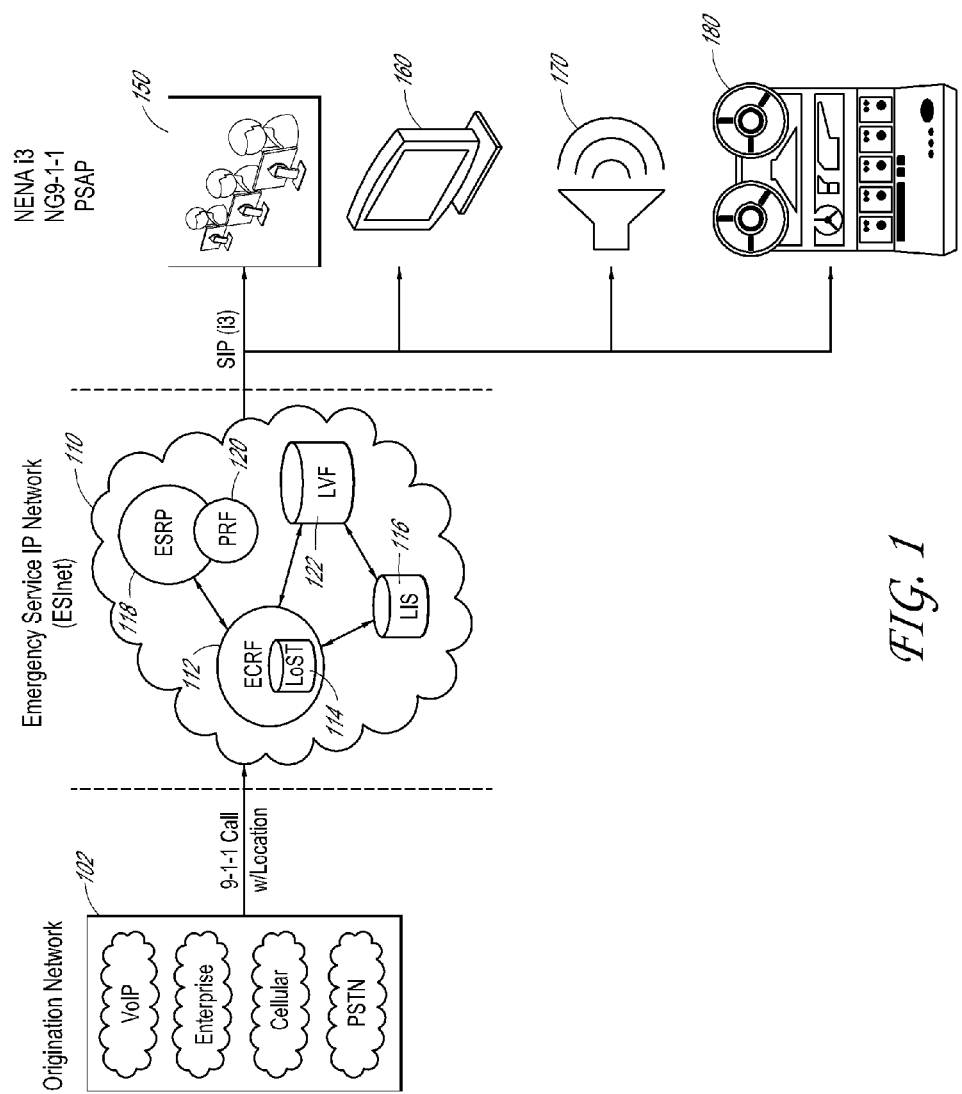
FIG. 1 shows a network diagram for an example of a packet switched multimedia capable emergency response system.

The following description and examples illustrate some exemplary embodiments of the disclosed features in detail. Those of skill in the art will recognize that there are numerous variations and modifications that are encompassed by its scope. Accordingly, the description of a certain exemplary embodiment should not be deemed to limit the scope of the present disclosure.

As mentioned in the background, it is desirable to provide emergency call services which, at a minimum, offer the same functionality as existing PSTN services, with the additional non-limiting benefit of making emergency calling more robust, less costly to implement, and multimedia-capable. While focus has been placed on the location and routing functions, providing robust entities to achieve the aforementioned desirable aspects has been lacking.

Described in further detail below are systems and methods for clustering of the emergency services routing proxy. The described features allow a group of ESRPs running as individual servers or a group of virtual servers, to be referenced using a single URI. This can provide further efficiencies and fault tolerance in routing emergency calls.

For managing the physical limitations of an ESRP, the features described represent one or more URIs for an ESRP as a cluster of available resources for managing calls to the URI. The URI is still a single instance for targeting calls and the cluster nodes handle calls to the URI. However, the processing nodes in the cluster can process multiple calls to the URI in parallel across nodes included in the cluster. Processing rules and policies may be seamlessly applied across the nodes of the cluster and drive a single state model for the URI.

From the upstream device(s) that route calls to the ESRP, such as a caller device or other ESRP, the URI and the cluster appear as a single ESRP and a single target URI. The node management within the cluster is agnostic to the originating device. A cluster may lose all but one node and still be available for call routing and appear whole to the upstream devices. The cluster manager will appear as a downstream ESRP for upstream devices and it will appear as an upstream ESRP for downstream devices. The clustered nature may not be known to the upstream and/or downstream devices. This transparency provides a non-limiting advantage of allowing the introduction of efficient, highly-available, and robust ESRP functionality into existing call flows.

The ESRP cluster management features are not describing how clustering or load balancing will be conceptualized as the concepts for those are well known in the industry. In an ESInet deployment, the described aspects provide a solution to scale out an ESRP network element. An additional non-limiting advantage to the scaling is to increase performance, as multiple nodes for the same element are configured to work together.

Standard clustering provides several points from which service may be provided. As a further non-limiting advantage, from a network perspective, the clustered ESRP appears as a single element (URI list) to the up and down stream elements. The aspects described illustrate how to optimize the traffic flow from cluster manager to the nodes without making the cluster manager the choke point in the system, and how to maximize the performance of multiple nodes in the cluster. In one respect, a forwarding table design similar to that of an IP network router is utilized. However, it should be emphasized that an IP network router forwarding table is different from the ESRP cluster routing in that the IP routing determines a path to a known destination. In ESRP cluster routing, more than one destination may provide the ESRP services.

Furthermore, from an i3 messaging perspective (e.g., registration, heartbeats, state notifications), the cluster management systems and methods describe how to aggregate information for each element in a cluster and represent the information as a single element message.

FIG. 1 shows a network diagram for an example of a packet switched multimedia capable emergency response system. The system includes an origination network 102. The origination network 102 is the location where the emergency multimedia data originates. The initiation of the transfer of information to the system from an origination network 102 is generally referred to as an event. Examples of origination networks 102 such as that shown in FIG. 1 include voice over IP (VoIP) networks, enterprise networks, cellular networks, or public switched telephone network (PSTN). It should be noted that events may be generated from a human user of a device capable of transmitting multimedia data (e.g., cell phone, landline telephone, Smartphone, person computer, tablet computer, email client) or an automated system coupled with the origination network 102. The coupling may be electronic, fiber optic, wireless or a combination thereof. In operation, an emergency call with location data is placed from the origination network 102 to an emergency service IP network (ESInet) 110.

The ESInet 110 can provide, among other functions, routing of the emergency multimedia data to an appropriate public safety answering point (PSAP) 150. For example, one ESInet 110 may be connected to multiple PSAPs. It is desirable to ensure the emergency multimedia data is handled by an appropriate PSAP 150. In one implementation, the ESInet 110 includes an emergency call routing function (ECRF) 112. The emergency call routing function includes a directory 114 of available PSAPs. The emergency call routing function 112 may be configured to determine the appropriate PSAP for incoming communications based, at least in part, on the location of the event. To determine the location, the ESInet 110 shown in the example of FIG. 1 includes a location information store (LIS) 116.

The incoming event is received by an emergency service routing proxy (ESRP) 118. The ESRP 118 may be configured to query the LIS 116 for the appropriate location information associated with the event. In some implementations, the ESRP 118 and LIS 116 are coupled with a location validation function (LVF) 122. The LVF 122 can be used to ensure the location for the event is a valid location. Once the ESRP 118 has identified a valid location for the event, the ESRP 118 may be configured to query the ECRF 112 using at least the validated location to determine the appropriate PSAP 150. The ESRP 118 can then route the event to the selected PSAP 150.

Once processed by the ESInet components, the resulting session initiation protocol (SIP) message is transferred via a packet protocol (e.g., NENA i3 Standard, TCP/IP) to the packet capable public safety answering point (PSAP) 150. The SIP message or other packet transferred multimedia emergency message (e.g., via SMTP, HTTP, HTTPS) is then used by the PSAP 150 to initiate an intake and response to the communication received from the origination network 102. Only one PSAP 150 is shown in FIG. 1. In other implementations, more than one PSAP 150 may be in communication with the ESInet. Furthermore, some PSAP 150 implementations treat each event as a discrete occurrence. This may create a situation where subsequent events related to a similar incident are not necessarily identified and routed to an agent who may be most familiar with the case. Each PSAP may include one or more agents capable of responding to the emergency event. In some implementations, the agent is a human. In some implementations, the agent is an automated responder (e.g., voice recognition call service).

As shown in FIG. 1, the packet may be routed to other devices such as a monitor 160, a speaker 170, or a recorder 180. The routing may be in the alternative or in parallel. In this way, the proper equipment may be selected for presentation of the data associated with a given case. As shown, the monitor 160, the speaker 170, and the recorder 180 are separate from but coupled with the PSAP 150. In some implementations, the monitor 160, the speaker 170, and the recorder 180 may be included within the PSAP 150 such as attached to an agent's workstation.

Figure 2:
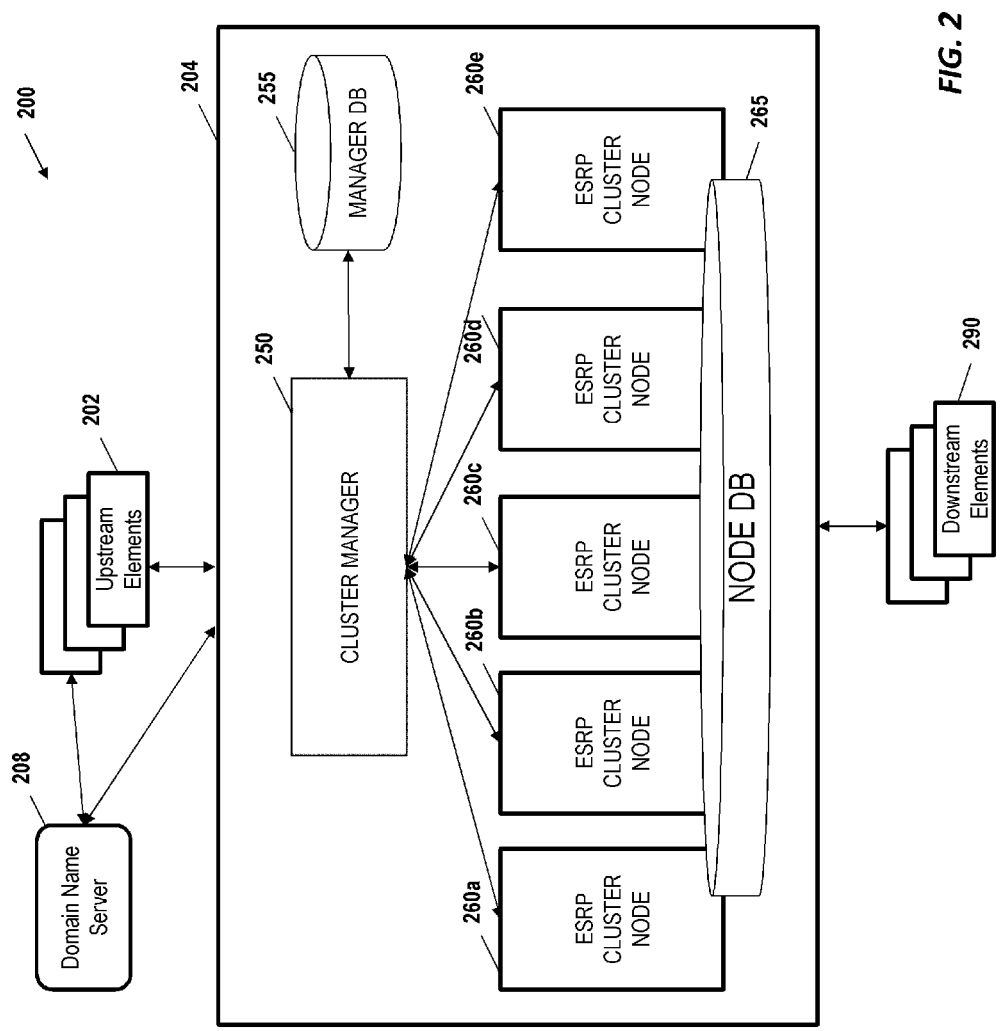
FIG. 2 shows a network diagram of an example emergency service IP network system including a clustered ESRP.

FIG. 2 shows a network diagram of an example emergency service IP network system including a clustered ESRP. The system 200 shown includes upstream elements 202. The upstream elements 202 may include a source device (e.g., emergency caller device) or another ESRP. The upstream elements 202 provide the call information in a packet format including call information such as a source identifier, location information, and the routing path used for the call up to the clustered ESRP 204. The upstream elements 202 may consult a domain name server 208 to identify the network location of the clustered ESRP 204.

The clustered ESRP 204 includes a cluster manager 250 and one or more ESRP cluster nodes 260a, 260b, 260c, 260d, and 260e (hereinafter collectively or individually referred to as ESRP cluster node 260).

The cluster manager 250 is configured to maintain information for ESRP nodes 260 within the cluster 204. In standalone ESRP configurations, the ESRP maintains several properties such as entity state, queue/endpoint URI list, queue state per URI, registration information about call routing entities (in some implementations referred to as "de-queuers"), heartbeat responses, and/or policy routing. In a clustered ESRP configuration, such as shown in FIG. 2, the cluster manager 250 may be configured to maintain these properties based at least in part on the characteristics of each ESRP node 260 within the cluster 204. The clustered ESRP 204 appears as a single ESRP to the upstream elements 202. In such instances, the ESRP may provide an entity state indicative of the operational status for the ESRP. The cluster manager 250 may be configured to report a status associated with "normal" if a majority of the ESRP cluster nodes 260 are reporting normal status. It will be appreciated that the cluster manager 250 may be configured to perform more complex processing of ESRP node data to provide the property information for the clustered ESRP 204. This may include comparing values from each ESRP cluster node 260 to a threshold, analyzing data over time (e.g., average for a period of time), or the like. The ESRP node data may be stored in a manager database server 255.

In addition to providing an interface for ESRP activity, the cluster manager 250 is configured to add and remove ESRP cluster nodes 260. ESRP cluster nodes 260 are call processing entities that contain ESRP business logic. The ESRP cluster nodes 260 in the cluster 204 are substantially identical, each providing the similar functional capabilities. In some implementations, ESRP cluster nodes 260 may be a mix of different physical devices with different limitation criteria. For example, ESRP cluster node performance may be impacted by one or more of memory available to the ESRP cluster node, proximity of the memory available to the ESRP cluster node, type of memory available to the ESRP cluster node, disk input/output, central processing unit (CPU) speed, other applications sharing resources with the ESRP cluster node (e.g., co-hosted location information service), network conditions (e.g., traffic, protocols, hops, etc.), and/or call volumes.

ESRP cluster nodes 260 are dynamic in that an ESRP cluster node can be added, removed, upgraded, or out of service as independent entities. The collection of nodes in the cluster 204 provides the ESRP capability to the upstream entities rather than relying on a single ESRP.

Within the cluster 204, each ESRP cluster node 260 may be assigned a unique identifier such as "ESRP1-node1." As ESRP cluster nodes are added to the cluster 204, the ESRP cluster nodes 260 are configured to register themselves via the cluster manager 250. The ESRP cluster node 260 may be configured to transmit a registration message to the cluster manager 250. The registration message may include the node identifier and information about the ESRP cluster node's capabilities (e.g., node identifier, CPU utilization, disk utilization, memory availability/utilization, alarms, calls in progress, call capacity, and the like). The registration message may also include information about the node 260 itself such as health information and priority. Health information generally refers to information which is used to estimate latency for the ESRP cluster node such as disk utilization, CPU utilization, memory utilization, time to process (latency), thermal state, etc.

Once the cluster manager 250 has registered the ESRP cluster node 260, the cluster manager 250 tracks the lifecycle of the ESRP cluster node. As ESRP cluster nodes 260 are removed or placed out of service, the ESRP cluster node 260 undergoing such change is configured to transmit a message to the cluster manager 250 identifying their state or de-registration from the cluster 204. The manager database server 255 may be included to support the functions of the cluster manager 250. For example, the manager database server 255 may store ESRP cluster node 260 registration and status information.

An ESRP cluster node may be configured to host multiple ESRPs which may be referred to as network elements. Such implementations may be desirable where multiple tenants share portions of the system. This allows multiple tenants to share resources of a single ESRP cluster node.

The cluster 204 may include a node database server 265. The node database server 265 is shown in FIG. 2 as a single entity. However, the node database server 265 may be implemented as a distributed database server with multiple instances included in the cluster 204. Each ESRP cluster node 260 is configured to use an instance of the node database server 265 to support the functionality described.

As a call is received from the upstream elements 202, the cluster manager 250 may identify, based on information included in the call, the ESRP assigned to handle the call. Once the ESRP is identified, an ESRP cluster node associated with the ESRP is identified for handling the call. The call may then be forwarded to the identified ESRP cluster node for further routing. As shown in FIG. 2, the call may be routed to one or more downstream elements 290. The downstream elements 290 may include another ESRP or a PSAP.

FIG. 3 shows a functional block diagram for an example cluster manager. The cluster manager 250 shown in FIG. 3 comprises one embodiment of the cluster manager 250 shown in FIG. 2. The cluster manager 250 in FIG. 3 provides further detail regarding the structures which may be included in the cluster manager 250 to support the described features.

The cluster manager 250 may send and receive information with the upstream elements. Example information which may be exchanged includes calls, events, or heartbeat information.

Calls are generally packet based emergency call sessions. The calls may include mixed media such as voice, video, images, text, binary data, and the like. Event information allows the cluster manager 250 to report the status of the ESRP and receive status information from upstream elements. The heartbeat provides further information regarding the status of the clustered ESRP to upstream elements. If the upstream elements receive the heartbeat at a predetermined interval, the ESRP cluster may be deemed functional and ready for routing calls.

Calls may be handled by a node within the cluster. The cluster manager 250 may be configured to receive the call and route it to the proper ESRP cluster node. The node may communicate its presence to the cluster manager 250 for inclusion into one or more clusters. A cluster management processor 302 may be included in the cluster manager 250. The cluster management processor 302 may be configured to process ESRP cluster node messages such as registration messages. The registration messages may be transmitted by a node wishing to join the cluster.

The registration messages may be received via a registration server 304. In one implementation, the registration server 304 is a web server hosting a registration server interface. Once a registration message is received, the cluster management processor 302 may determine if the requested registration action is permitted. A registration action may include "add node to cluster," "remove node from cluster," or "update node in cluster." The permissibility of an action may be based on, for example, ESRP URI, requested node name (e.g., do not allow to join if name is not unique), security concerns (e.g., message not properly authenticated, authorized node limits reached), and the like.

Once a node is registered, a messaging server 306 may be included in the cluster manager 250 to communicate status messages to/from one or more registered nodes. The messaging server 306 may be used to communicate with a specific node or with a set of cluster nodes. The messaging server 306 may be configured for one or more of subscription messaging and broadcast messaging.

Having described some of the structures to support the creation of the cluster of nodes via a registration, at some point, the cluster manager 250 may receive a call. The cluster manager 250 may include a SIP proxy 308. The SIP proxy 308 may be configured to receive calls from upstream elements and provide the call to the appropriate ESRP cluster node 260.

The SIP proxy 308 may be configured to perform a next hop lookup in the forwarding table for the targeted URI. The lookup may be performed when the cluster manager 250 receives a call from an upstream ESRP. The forwarding table may contain the mapped URI for the ESRP cluster node. Based on a comparison of the targeted URI and the URI included in the forwarding table, the ESRP cluster node to handle the processing of the call is identified by the SIP proxy 308. The forwarding table may be dynamically updated as the ESRP cluster nodes change state. Accordingly, the lookup may be performed for each call. In some instances, two calls targeted for the same URI may be routed to different ESRP cluster nodes as the nodes transition.

The SIP proxy 308 and the cluster manager may be configured to simply pass the call to the identified location. Accordingly, the cluster manager 250 may not perform any processing and simply act as a pass through router.

Using the URI, one or more candidate ESRP cluster nodes may be identified as being registered to service the URI. This information may be stored in the manager database server 255. The determination may also be based on information provided by a call load balancer 310. Since multiple ESRP cluster nodes may be configured to service a particular ESRP URI, further load balancing may be included to manage the call volumes amongst the nodes.

The call load balancer 310 may be configured to load balance calls for the ESRP cluster across the ESRP cluster nodes in the cluster. From the upstream entity's perspective, the upstream ESRP is routing calls to a single downstream ESRP. The call load balancer 310 may be configured to use a policy based load balancer to identify a call route to the best available node for handling a given call. The "best" routing policy may be identified based on one or more of the following conditions: node health, node entity state, node priority, node temperature (e.g., coolest; lowest mean temperature over a period of time; etc.), preference (e.g., ranking), memory utilization, node load, or queue availability. In some implementations, the call load balancer 310 may be configured to set the distribution policy based on round robin or call priority. This distribution model may be applied upon identifying more than one available node for a given call. The call load balancer 310 may be configured to continuously evaluate the conditions and maintain a list of nodes per target URI. This list of nodes serves as a forwarding table for routing calls.

One or more policies 322 may be obtained by the cluster manager 250. For example, cluster management policies may be stored in the manager database server 255. The policy may include information indicating the registration policy for the cluster. The registration policy may include a maximum number of cluster nodes, status reporting policies (e.g., how to aggregate status from individual cluster nodes to provide an overall status for the clustered ESRP), event reporting policies (e.g., which events are reported to upstream elements), load balancing policy (e.g., round-robin, random, etc.), and the like.

Each of the elements included in the cluster manager 250 may be coupled by a bus system 320. The bus system 320 may include a data bus, for example, as well as a power bus, a control signal bus, and a status signal bus in addition to the data bus. The components of the cluster manager 250 may be coupled together or accept or provide inputs to each other using some other mechanism.

FIG. 4 shows a functional block diagram of an example ESRP cluster node. The ESRP cluster node 260 includes a node manager 402. The node manager 402 may be configured to generate, transmit, receive, and decode node status and registration messages. For example, the node manager 402 may be configured to register the node with the cluster manager 250. The node manager 402 may be configured to transmit status messages via the messaging server 306 included in the cluster manager 250. For example, the node manager 402 may detect a shutdown event for the ESRP cluster node 260. Upon such detection, the node manager 402 may transmit a remove from cluster registration message along with a status update. The node manager 402 may be configured to store state changes and events in the node database server 265.

Calls may be received by the ESRP cluster node 260 via a call processor 404. The call processor 404 may be configured to determine the route for a given call based on information included in the call such as the call originator location information, call originator telephone number, call originator IP address, or the like. The determination may include consulting a policy routing function processor 406.

The ESRP cluster node 260 shown includes the policy routing function processor (PRF) 406 configured to manage the queues and policy routing rules for calls. Since the cluster is built up of like nodes, each ESRP cluster node has the same set of URIs configured. The configurations of queue names, domain names, policy names, etc. may be the same for each ESRP cluster node.

As an ESRP cluster node comes online, the PRF 406 associated with the node is configured to send a registration request for de-queuing calls to the cluster manager 250. The cluster manager 250 maintains information regarding each registered ESRP cluster node and its corresponding de-queue state. The information may be maintained in a table such as that shown in Table 1 below, and stored in memory such as the manager database server 255.

TABLE 1

| Node 1 | Queue URI | Call Count |
| Node 2 | Queue URI | Call Count |
| Node 3 | Queue URI | Call Count |

The queue URI associated with each node in a cluster is the same. Each node within the cluster may have different call counts. The overall queue count may be reflected as a result of the total calls threshold.

Similarly, the cluster manager 250 may be configured to maintain information regarding URIs and the nodes registered thereto. This information may be maintained in a table such as that shown in Table 2 below, and stored in memory.

TABLE 2

| Queue URI 1 | List of nodes registered (using node identifier) |
| Queue URI 2 | List of nodes registered (using node identifier) |

Once the queue URI is registered, the cluster manager 250 may be configured to transmit a single registration to the upstream ESRP with the de-queue information identifying the cluster manager 250 rather than an individual ESRP cluster node. As long as there is at least one de-queue node registered, the registration upstream may be maintained. Once all ESRP cluster nodes associated with a URL have de-registered, then the cluster manager 250 causes the upstream registration to be removed. As additional ESRP cluster nodes come online and continue adding to the de-queue registration, the changes will have no impact upstream. Such node management is handled internally to the cluster by the cluster manager 250. Furthermore, the cluster manager 250 is not configured to queue any calls. Instead, the cluster manager 250 is configured to forward a call to a registered ESRP cluster node.

One of the challenges in cluster management is the use of fully qualified domain names (FQDNs) for URI. Services that may be associated with the same FQDN may be provided by multiple ESRP cluster nodes. From a cluster perspective, the FQDN associated with a given URI and service set need to be associated with an ESRP cluster node that is configured to process these requests.

From an upstream entity perspective, the URI identifies the single ESRP cluster, not necessarily an ESRP cluster node within the cluster. When the upstream entity sends a call to the URI, the upstream entity may be configured to resolve the address of the cluster via a domain name lookup via a domain name server (DNS) for the URI name of the ESRP. The DNS entry will point to the network address of the cluster manager 250. When the cluster manager 250 in turn forwards the call within the cluster, multiple ESRP cluster nodes may be associated with the same URI name.

To ensure proper routing of the call, the cluster manager 250 may be configured to manage not only the mapping of URIs to the ESRP cluster nodes that registered with the URI, but also the SIP or service IP for the URI. One way the cluster manager 250 can manage this information is by maintaining internal records in memory such as the manager database server 255. Another way the cluster manager 250 may be configured to manage this information is by dynamically updating the DNS records. For example, the cluster manager 250 may be configured to maintain its own DNS server for local resolution that it uses for URI mapping.

The mapping of a URI may be resolved first to the ESRP cluster. Once a cluster is identified, a tenant hosted by the ESRP cluster is identified. Once a tenant is determined, an ESRP cluster node associated with the tenant is identified. The unique addressing of the URI is to the IP address of the signaling service (SIP) for the tenant within the ESRP cluster node.

To ensure the timely and efficient routing of calls, an upstream ESRP is configured to maintain the element state of the downstream ESRP. The state of the downstream ESRPs may be used by the upstream ESRP to determine a routing policy for a call. An upstream ESRP identifies a downstream ESRP through the use of a universal resource identifier (URI). In a clustered environment there are potentially multiple ESRP cluster nodes configured to service the same URI. Each ESRP cluster node may have independent element states. However, there is currently no way for ESRP cluster nodes to individually report state information to an upstream ESRP. Accordingly, the cluster manager 250 is configured to generate an element state for the cluster 204 (e.g., to report upstream) based on the ESRP cluster node element state(s).

The cluster manager 250 may be configured to receive element states from the ESRP cluster nodes and manage the states internally. The cluster management processor 302 may then generate an overall state for the cluster 204 based on the individual ESRP cluster node states for reporting upstream. In one implementation, the cluster manager 250 may report the ESRP cluster state as the best condition of one or more ESRP cluster nodes. For example, in a cluster including five ESRP cluster nodes, if two nodes are "normal" and the other nodes are either unavailable, unmanned, or maintenance, then the cluster manager will report "normal" upstream. The cluster manager 250 may be configured to perform more complex generation of state information. For example, the cluster manager 250 may include a state reporting policy to indicate the state to provide when the ESRP cluster nodes report a given state. For example, a state reporting policy can indicate that at least three nodes have to report "normal" in order to generate the state of "normal" for the cluster.

In addition to the entity state, the cluster manager 250 may also be configured to maintain an administrative state for the ESRP cluster 204. The cluster manager 250 may be configured to report the administrative state to an upstream entity using a notification. Example administrative states include normal, maintenance, major incident, down, coming up, and unmanned. Other administrative states may be included to provide more (or fewer) levels of granularity for specifying the state of the cluster.

The cluster manager 250 may be configured to use one or more message queue subscriptions to receive element state information from the ESRP cluster nodes. Message queue subscriptions may also be used to respond to subscription requests from upstream ESRPs. The cluster manager 250 may generate and transmit notify messages to provide the above referenced state information to upstream entities.

The cluster manager 250 may be configured for "heartbeat" messaging to obtain state information for registered ESRP cluster nodes. The heartbeat messaging is similar to the heartbeat messaging performed between ESRPs. Heartbeat messaging generally includes transmitting a message to registered nodes and waiting for a response from each. Those which respond can be identified as functioning. Those which do not respond may be identified as having questionable or offline state. The response from the node may include ESRP cluster node status information such as number of active calls, number of calls handled since last report, ESRP cluster load information, or the like.

When the upstream ESRP heartbeats the cluster manager 250, the cluster manager 250 may be configured to respond based on the policy configuration for cluster health. The policy for cluster health may be based on the number of nodes active and capacity of the nodes. If the health check of the cluster returns a negative, then the heartbeat responses upstream stop so the cluster appears unavailable.

The cluster manager 250 may be further configured to manage queue states for a target URI. Queue state management is similar to entity state management. One difference is the level at which the queue management is performed. For queue state management, the cluster manager 250 is configured to manage the queue state base on each target URI and the state of PRF and queues in each of the respective ESRP cluster nodes. The management may include receiving a registration message once a queue is established. The registration message may identify the target URI and/or ESRP cluster node the queue will be supporting. The management may further include receiving incremental queue state information indicating the status of a queue. Queues which may go offline or do not provide status after a predetermined period of time may be de-registered by the cluster manager 250.

Each ESRP cluster node may include an instance of the node database. The ESRP cluster nodes may be configured for data replication. Data replication may be implemented using a distributed database, such as Cassandra by the Apache Group. The distributed database with replication ensures session data is maintained across the ESRP cluster nodes. The databases may be configured for synchronous replication across ESRP cluster nodes. In some implementations, clusters may include geo-diverse ESRP cluster nodes. In such implementations, replication may be performed over a wide area network (WAN). Replication via a WAN may incur latency as nodes separated by distances are synchronized. Accordingly, it may be desirable in some implementations to configure the system such that co-located ESRP cluster nodes (e.g., same LAN) are replicated. ESRP cluster node read operations from the database may be performed locally, that is, from the database instance included in the ESRP cluster node invoking the operation.

In some implementations, the cluster manager 250 may be configured to use a replicated database as its manager database server 255. The replicated database may be configured to replicate state information and forwarding tables between an active instance and a standby instance of the cluster manager.

As events associated with a cluster manager occur, information regarding the event may be reported such as to an upstream and/or a downstream ESRP or a public safety answering point. Event alerts may be categorized to assist in the prioritization of transmission of the event. Two categories which may be included are information event and major event. A major event is one which can substantially affect the routing of a call. An information event is one of general interest which may not impact the routing of a call. Alerts may be further classified as clearable or non-clearable. Clearable events are events that require an action to remove, such as configuration update. Major events are generally clearable.

One event which may be identified is a node join event. The node join event indicates that an ESRP cluster node has been added to a given cluster. The node join event may be assigned the category of information event. As the node join event is informational in nature, no corrective action is needed to clear this event.

Another event which may be identified is a node leave event. The node leave event indicates that an ESRP cluster node has left a given cluster. The node leave event may be assigned the category of information event. Similar to the node join event, the node leave event is informational and thus, no corrective action is needed to clear this event.

Further informational events that may be identified include node up event (e.g., node is started/still running), cluster up event (e.g., cluster is started/still running), and entity state (e.g., normal, maintenance, major incident, down, coming up, and/or unmanned) change.

Major events that may be identified include a negative policy event, node down event, and cluster down event. A negative policy event generally refers to the condition when no route is identified for a call. In such instances, the call cannot progress toward a PSAP. As this may prevent calls from being timely routed to an answering point, this event requires a reconfiguration to provide routing policy that permits identification of a route for the call. A node down event indicates and ESRP cluster node is going offline and a cluster down event indicates an ESRP cluster is down. As these may be due to equipment failure, misconfiguration, or other anomalous condition, the event may require investigation and reconfiguration to clear.

In some implementations, the cluster manager 250 may be configured to provide status information via logging. The following are example logs the cluster manager 250 may be configured to generate: configuration changes, node registrations, de-queue registrations, entity state changes, and node alerts. The cluster manager 250 may be configured to perform i3 logging. However, in some implementations, the i3 logging may be configured to be performed within each ESRP cluster node rather than by the cluster manager.

To increase the availability of the ESRP cluster, the cluster manager 250 may be implemented as an active standby pair. The pair may include virtual router redundancy protocol (VRRP) as a common service IP address for the upstream ESRP. Each instance of the cluster manager 250 may be configured to maintain state and cluster registration information in the replicated database.

If the active instance of the cluster manager 250 fails, the standby instance may be configured to take over. The standby instance may be configured to assume control based on the state and registration information stored in the replicated database. In such a situation, the standby instance becomes the active instance and remains as such even if the failed instance comes back online. The failed instance, once restored, may be configured to act as the standby member of the pair.

ESRP cluster nodes may be configured to service one or more tenants. The cluster manager 250 may be owned and operated by a network owner such as a carrier, a county, a PSAP. The cluster manager 250 is agnostic to the tenants that may be contained within an ESRP cluster node. Whether servicing a single tenant or multiple tenants, the ESRP cluster node may be managed as described herein.

Figure 5:
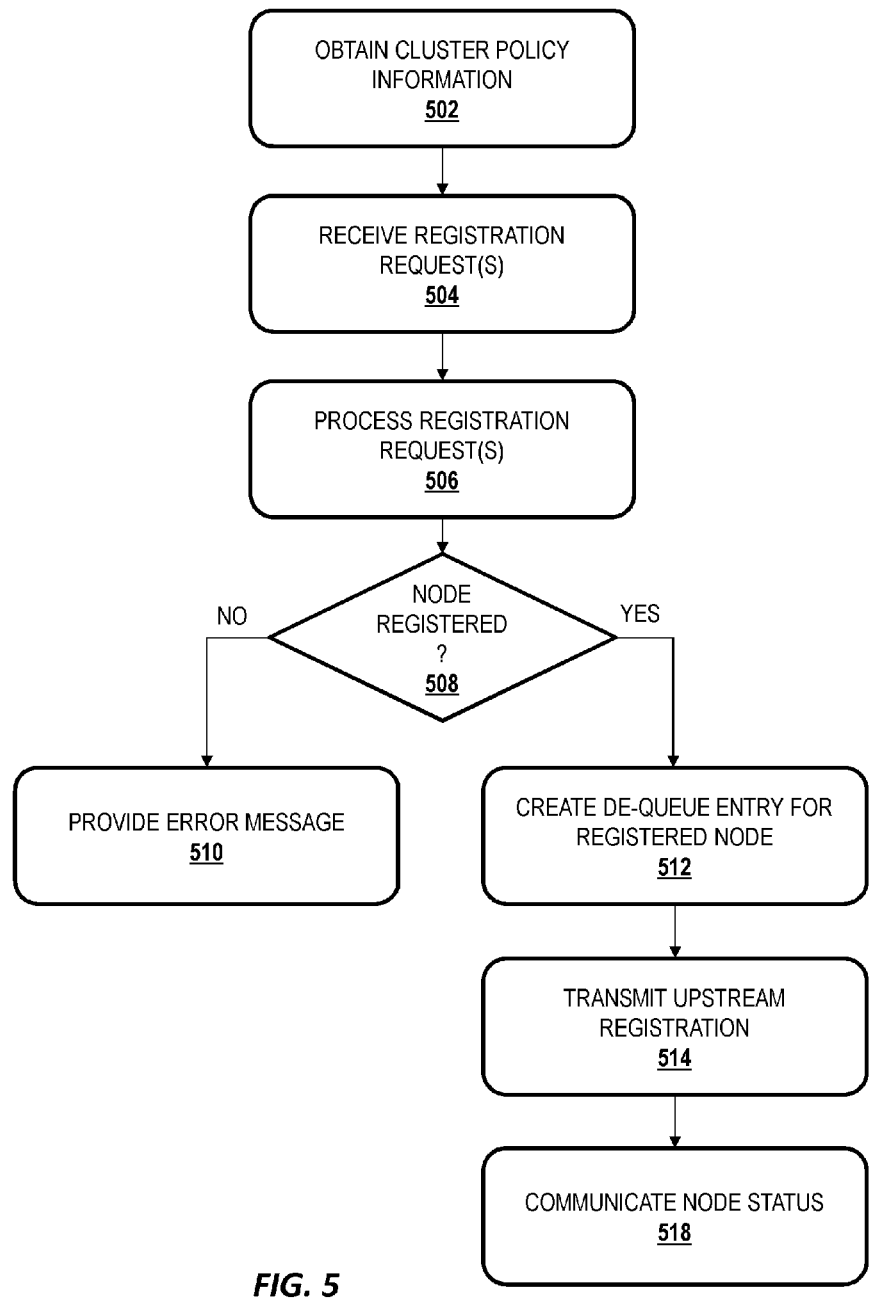
FIG. 5 illustrates a process flow diagram for a method of creating a clustered ESRP including one ESRP cluster node.

FIG. 5 illustrates a process flow diagram for a method of creating a clustered ESRP including one ESRP cluster node. The method described in FIG. 5 is for registering to a single ESRP cluster node. However, the process may be performed in parallel for multiple ESRP cluster nodes included in the cluster. The process shown in FIG. 5 may be implemented in whole or in part via one or more of the devices described herein such as the cluster manager 250 and the ESRP cluster node 260.

At node 502, policy information is obtained for the cluster. Obtaining the policy information may include receiving policy information via a user interface from an administrative interface, retrieving the policy information from a memory, or generating the policy information based on received cluster information.

At node 504, one or more node registration requests are received. The node registration requests may include an ESRP endpoint URI that the node transmitting the request is configured to service. At node 506, the registration request is processed. The processing may include validating the request, ensuring the request is authorized for the node, and the like. At decision node 508, a determination is made as to whether the node has been added to the cluster. If the node has not been added, at node 510, an error message may be provided and the process may terminate. In some implementations, the process may return to node 504 to receive further registration requests.

If it is determined in node 508 that the node has been added, at node 512, a de-queue registration entry is created. The de-queue registration entry allows the cluster manager to identify the ESRP cluster node for handling calls directed to the URI. At node 514, a registration is sent to an upstream entity including identification information for the cluster as the servicing entity for the URI. This creates a link between the upstream entity and the cluster. Provided at least one ESRP cluster node is registered for the URI, the upstream registration will be maintained.

At node 518, a status message is communicated between the cluster manager and a registered node. The status message may include cluster status information, node status information, node events, cluster events, or the like. The status message may be stored for further processing such as providing a heartbeat for the ESRP to upstream entities.

The method shown in FIG. 5 may be repeated, in whole or in part. For example, another registration request may be received after joining the cluster, at node 504. Such post-joining registration requests may include updated registration information or a request to leave the cluster. Node 518 may be repeated as the node status changes over time.

Figure 6:
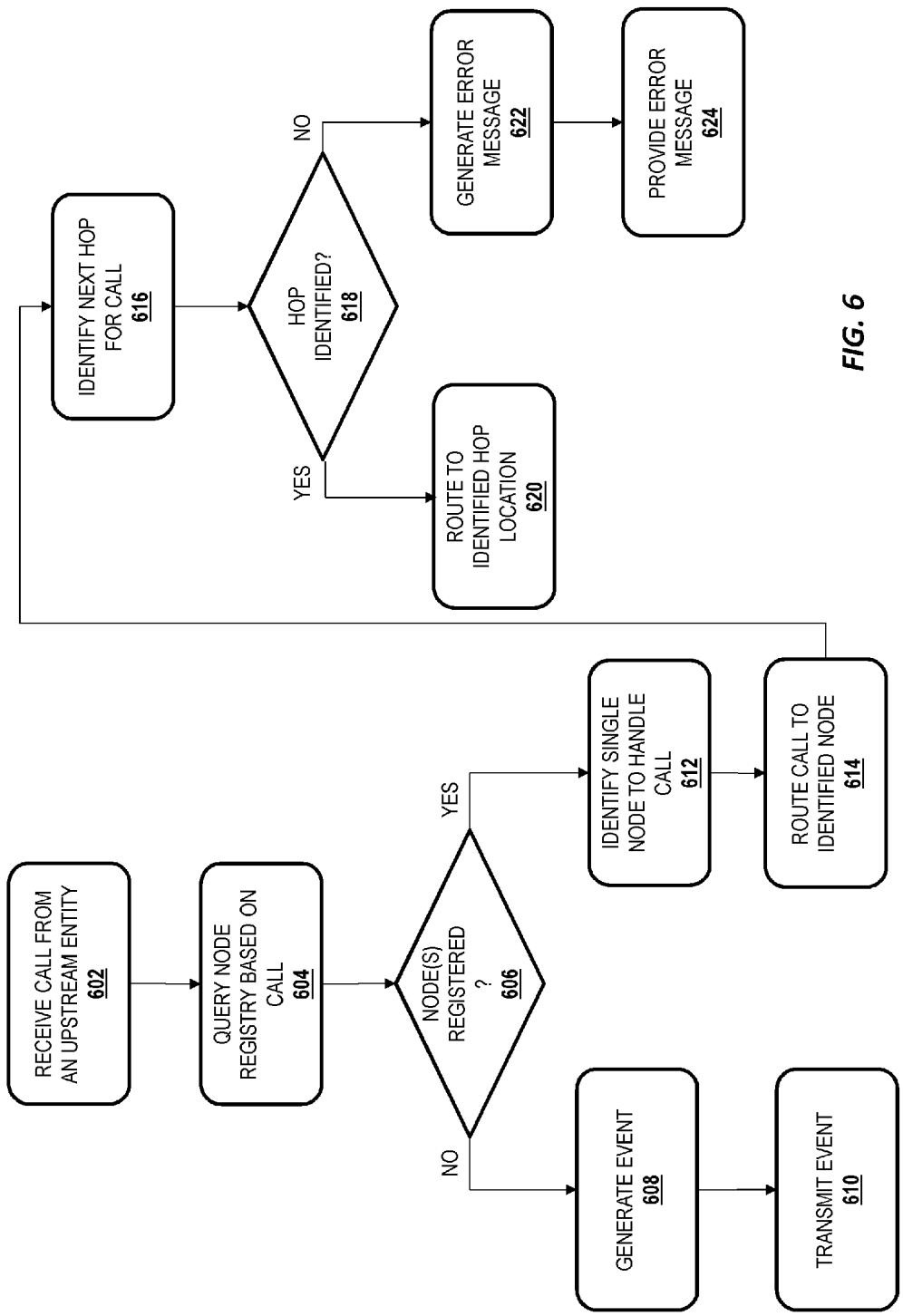
FIG. 6 illustrates a process flow diagram for a method of routing a call to an ESRP cluster node.

FIG. 6 illustrates a process flow diagram for a method of routing a call to an ESRP cluster node. The method shown in FIG. 6 may be implemented in whole or in part via one or more of the devices described herein such as the cluster manager 250 and the ESRP cluster node 260.

At node 602, a call is received from an upstream device. The call includes an endpoint URI indicating the ESRP to receive the call. At node 604, the local URI registry is queried using the endpoint URI. At node 606, a determination is made as to whether the registry includes one or more nodes associated with the received endpoint URI. If the determination is negative, an event is generated at node 608. The event may be a major event because the call cannot be routed any further. At node 610, the event may be transmitted such as to the upstream device to allow rerouting of the call.

If the determination at node 606 is positive, at node 612, a node for routing is identified. The identification may include communication with a load balancer if more than one node is identified to determine, in a balanced way, a node to service the call. The determination may be based on policy information as described herein. At node 614, the call is routed to the ESRP cluster node. At node 616, the ESRP cluster node identifies the next hop for the call. The identification is based on the ESRP cluster node's policy routing function. For example, location information included in the call may be used to identify the next destination for the call. The next hop may be another ESRP or a PSAP. In some implementations, the next hop ESRP may be a clustered ESRP. However, from the perspective of the ESRP cluster node, an ESRP appears as an ESRP whether it is configured to be a clustered ESRP or a single, stand-alone ESRP. At node 618, a determination is made as to whether a next destination has been identified. If so, at node 620, the call is routed to the next destination. Otherwise, at node 622, an error message may be generated by the ESRP cluster node. The error message may include information identifying the call and the node. At node 624, the error message is provided by the node. For example, the error message may be provided to the cluster manager. The cluster manager may attempt to re-route the call to another cluster node at node 604 or, if no other cluster nodes are available, transmit an error to the upstream entity which transmitted the call such as via node 608 and node 610.

Figure 7:
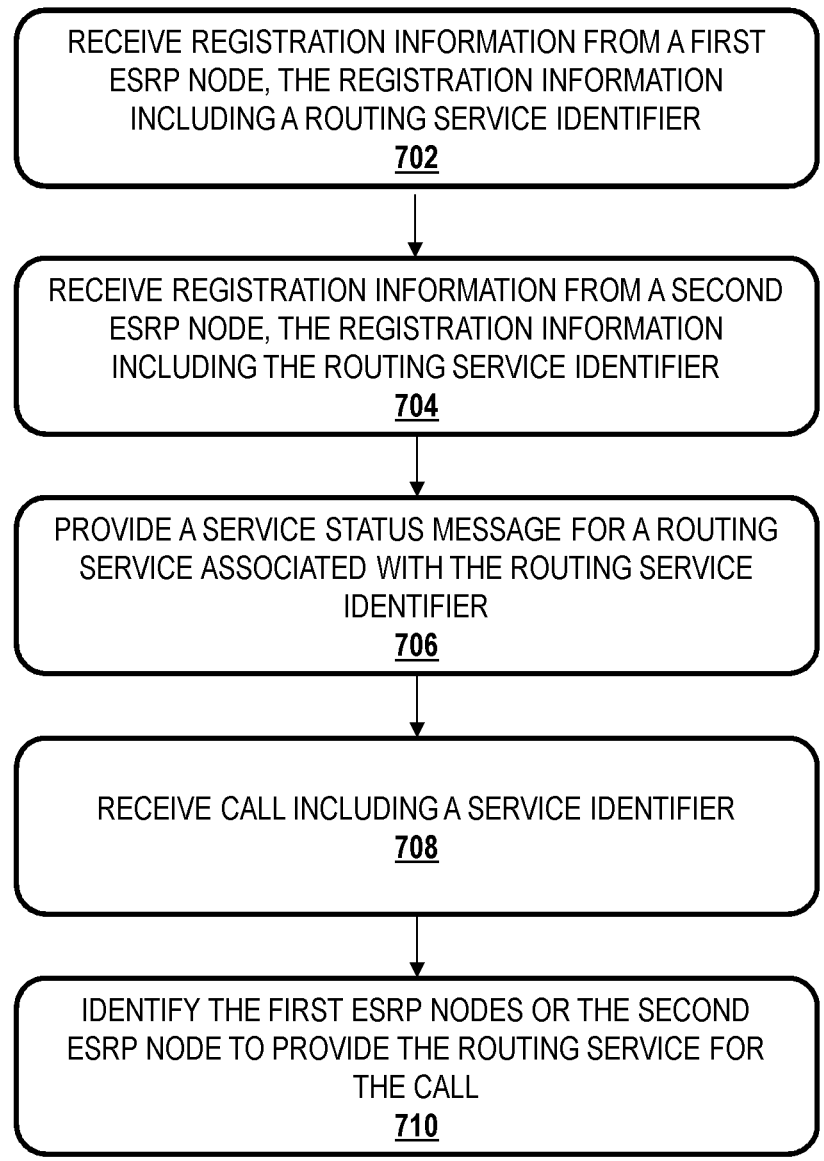
FIG. 7 shows a process flow diagram for a method of emergency services call routing.

FIG. 7 shows a process flow diagram for a method of emergency services call routing. The method shown in FIG. 7 may be implemented in whole or in part via one or more of the devices described herein such as the cluster manager 250.

At node 702, first registration information is received at an electronic device including a cluster management processor. The first registration information is received from a first emergency services routing proxy node. The first registration information includes a routing service identifier. In some implementations, the routing service identifier may be a URI.

At node 704, second registration information is received from a second emergency services routing proxy node. The second registration information includes the routing service identifier (e.g., the routing service identifier received at node 702).

At node 706, a service status message for a routing service associated with the routing service identifier is provided. As there may be more than one provider of the service, the service status message indicates an aggregated service status in consideration of information associated with the various providers for the identified service.

At node 708, a call is received. The call includes a service identifier. The service identifier indicates the routing service requested for the call. The call may be a SIP call including the service identifier in a header field of the call.

At node 710, the first emergency services routing proxy node or the second emergency services routing proxy node is identified to provide the routing service for the call. The identification is based at least in part on the service identifier included in the call, the registration information for the first ESRP node, and the registration information for the second ESRP node.

The features described illustrate how the routing and performance limits of ESInet due to performance and scalability of the ESRP and the processing functions of the ESRP may be overcome. The limitations include latency in ESRP which can cause degraded service to citizens due to routing decisions based on, for example upstream policies. Even if there are agents and handling capabilities in the PSAP, calls may be redirected due to performance limitations of the ESRP. These issues may be compounded when routing through multiple layers of ESRP. For example, in the terminating ESRP, processing overhead may be significantly higher than in other ESRP entities due to agent logic and controls. In i3 systems, for example, a single URI is contained within an ESRP. An ESRP is represented as a single machine. Deploying routing in a large city or country deployment would require overload and routing decisions to traverse calls to call takers which could lead to calls prematurely being delivered to backup centers. These are just some of the concerns addressed by the aspects discussed herein.

Clustering an ESRP into multiple nodes, such as shown in FIG. 2, that represent the single URI provides one non-limiting advantage of alleviating the performance and scalability bottlenecks with current systems. The described systems and methods further provide an advantage in that the cluster appears as a single system to the upstream entities (e.g., ESRP). For example, with loss of any number of nodes in the cluster, the ESRP should still be routable and appear whole to the upstream devices.

The cluster manager, such as shown in FIGS. 2 and 3, may be provided to facilitate the maintenance of the ESRP cluster and the nodes contained within the cluster. The cluster manager manages: node status, node activity, node load, and node availability/state. The cluster manager is configured to consolidate upstream event messages and to provide a cluster abstraction from upstream entities. The cluster manager may provide load balancing for SIP calls and policies around high availability (HA). The cluster manager provides an interface for nodes to join, remove, and transition within a cluster. The cluster manager also generates intelligent heartbeat/status information for transmission to upstream entities and, in some implementations, downstream entities. The cluster manager may further provide session affinity to nodes such that related sessions are provided to the same or similar nodes.

In one example implementation, nodes may be implemented as virtual machines (VMs) that run communication services (e.g., ESRP). A cluster may refer to a set of nodes with equal or common services. A functional cluster may include a message bus, a replicated database, and a policy routing function.

Each node in the cluster signals to the cluster manager as if it is the only node in the cluster. Nodes need not know about each other or the state of other nodes within the cluster. The cluster manager receives messages from the nodes and consolidates them into a single message up stream. For example, the nodes may transmit messages according to a standard, such as i3, as if the node was the only provider of the service (e.g., ESRP PRF). Any messages received by the cluster manager from an upstream device are forwarded to one node in the cluster. Once the first message during a communication session is forwarded to a node, that node is assigned an affinity for subsequent messages for the communication session. The affinity information may be stored in the replicated data storage such that the information is available to all nodes in the cluster. As long as the node is available, subsequent messages for the communication session will be forwarded to the node. In the event the node is unavailable, the affinity information may be adjusted to reflect another node that will be assigned to process the communication session. For a new call, node selection may be based on a forwarding table identifying the nodes within the cluster associated with a particular ESRP. The cluster manager will maintain affinity to the node selected for any particular session. The cluster manger applies polices based on node status and capability. The policies may not be confined only to SIP communications. For example, the policy may relate to time, location, or another aspect.

One role of the cluster manager is to receive and forward calls as quickly as possible. As such, the cluster manager will not generally process the call once received. The cluster manager may be configured to check the forwarding table, to determine where to forward the call based on information included in the call (e.g., ESRP URI). Once identified, the call is sent downstream. The policy and cluster manager are responsible to build the forwarding table based on the nodes registered within the cluster. Call forwarding to nodes is done based on preference and order as defined, for example, in the forwarding table. Outbound initiated calls from the nodes go directly to the upstream elements and not via the cluster manager.

Node management allows nodes to be added and removed from the cluster. Initial node configurations may be statically defined such as via a configuration file. Registration may be performed via a service interface (e.g., web-service) provided by the cluster manager or via the message bus. The cluster manager may receive registration from one or more nodes. However, only a single registration for the ESRP is sent to upstream entities. In some implementations, the upstream entity may respond with an acknowledgment message (e.g., OK). In such implementations, the cluster manager may provide this acknowledgment message to one node registered with the cluster. The registration state for the nodes may be saved in the distributed database, thereby making the information available to all PRF instances in the cluster.

Node status updates may be provided using the service interface and/or message bus to transmit messages from the node to the cluster manager. For example, when a node joins a cluster, the node updates cluster manager with a status message. Once received, the cluster manager is configured to include the node on the forwarding list as eligible to receive calls for the specified URI. When a node is removed from the cluster, the cluster manager is notified.

Nodes may transmit status to the cluster manager using a messaging protocol. CPU status, memory status, disk status, processing rate status, message queue thresholds, application alerts, thermal state, or other node information may be provided. Based on the status information, the cluster manager may evaluate policies to determine forwarding preference and order.

Upstream entities may also subscribe to receive one or more messages related to an ESRP. The subscription from upstream is sent to one node within the cluster. The subscription may then be saved for the ESRP cluster, such as within the distributed database. In some implementations, all nodes within the cluster respond to the cluster manager with a notify message. However, only a single notification is sent to the upstream entity from the cluster manager based in part on the received notify messages. For example, the upstream entity may be configured to receive a queue state. Queue state for a clustered ESRP may be reported as a sum of all queue states for each node within the cluster. As described above, responses may be based on policy rules. For example, to report a "normal" status, a policy may require at least two nodes to report "normal" within a given cluster.

A further aspect which may be facilitated by the cluster manager is the so-called heartbeat for the ESRP cluster. As upstream elements request a heartbeat for the clustered ESRP, the cluster manager will respond based on the health of each node as applied through one or more policies. This is referred to as intelligent heartbeats. Downstream heartbeat requests are transmitted by each node. For high availability (HA) implementations, each node in the cluster is active and calls are load balanced. If a node in the cluster fails, the HA subsystem may be configured to notify another node in the cluster to take over calls that were on the "dead" node. The new node may re-initialize the active calls that are up from that node. In-active calls (e.g., calls that are unanchored or not in the final queue) may be dropped or placed in a queue for manual or automated clean-up. Clean-up may include, for example, dropping the call, re-routing the call, and/or re-activating the call.

Figure 8:
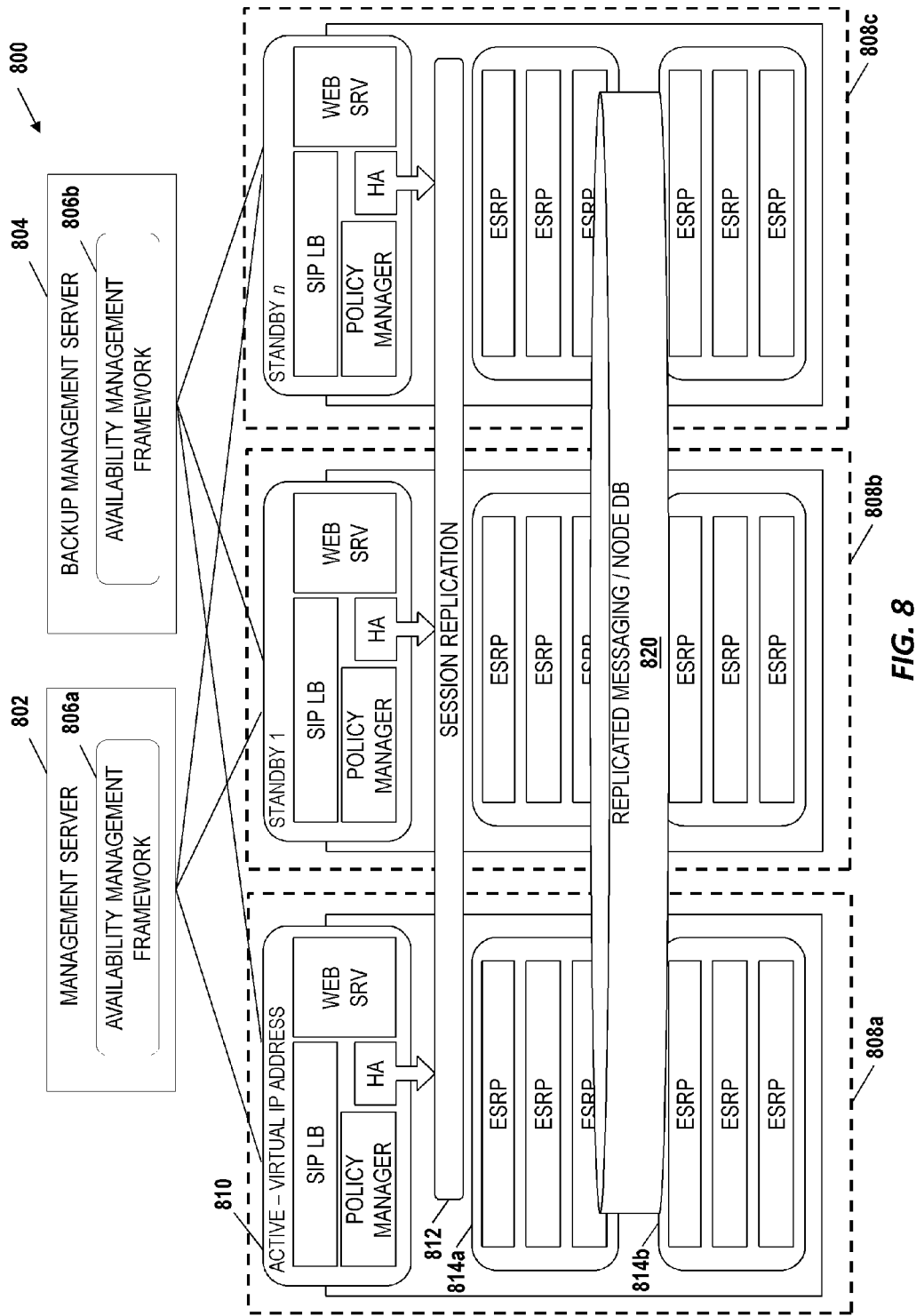
FIG. 8 shows a deployment diagram of a high-availability clustered ESRP.

FIG. 8 shows a deployment diagram of a high-availability clustered ESRP system. The system 800 includes a management server 802. The management server 802 is configured to manage the high-availability clustered ESRP system 800. One aspect which is managed by the management server 802 is availability. The management server 802 shown in FIG. 8 includes an availability management framework 806a. The availability management framework 806a is configured to monitor active clustered ESRPs and, upon detecting an error or failure, configure the system 800 to utilize one or more standby clusters. The availability management framework 806a provides configuration information for the active cluster manager instance as processing conditions change. Examples of processing conditions include cluster manager status, tenant status within a cluster, node status within a cluster, upstream device status, and downstream device status. It will be understood that the management server 802 may be configured to perform other management functions such as security, logging, and the like.

The system 800 shown includes a secondary management server 804. The secondary management server 804 provides similar functionality as the management server 802. However, the secondary management server 804 is a backup server which may begin management responsibilities upon failure or unavailability of the management server 802. The secondary management server 804 also includes an availability management framework 806b similarly configured to the availability management framework 806a.

Both the management server 802 and the secondary management server 804 are configured to be in data communication with clustered ESRPs included in the system 800.

The system 800 shown includes three clustered ESRPs, an active clustered ESRP 808a, a first standby clustered ESRP 808b, and a subsequent standby clustered ESRP 808c. In some implementations, additional standby clusters may be included such as three, four, five, ten, or twenty-three standby clusters. In some implementations, a single standby cluster may be desirable. The clusters may be addressed using virtual addressing such as virtual IP addresses and dynamic MAC addressing. This allows traffic addressed to the active clustered ESRP 808a to be directed to one of the standby clusters through configuration of the address information for the cluster server. For example, if the active clustered ESRP 808a is assigned the address 123, when the first standby clustered ESRP 808b is identified to manage calls, the active clustered ESRP 808a will unregister the address 123.123.123.123 while the first standby clustered ESRP 808b will register as the endpoint for address 123.123.123.123. Once complete, the first standby clustered ESRP 808b will be the "active" cluster. While the example endpoint address discussed is presented in IPv4 format, IPv6 format or another addressing format configured to identify a network location for a device may be used.

Each of the clustered ESRPs within the system 800 may be similarly configured and include similar components. The active clustered ESRP 808a includes a cluster manager 810. The cluster manager 810 is similar to the cluster manager 250 shown in FIG. 3. The cluster manager 810 includes a SIP call load balancer (SIP LB), a policy manager, and a webserver. The webserver may be configured to provide the registration and messaging interfaces for the cluster manager 810. The cluster manager 810 also includes a high availability processor (HA). The high availability processor is configured to provide session replication via a session replication server 812. The session replication server 812 may be implemented in one embodiment using Hazelcast, a commercially available open-source software package from Hazelcast, Inc. Session replication includes, for example, replication of SIP events. The session replication server 812 may be configured to checkpoint data to all of the standby ESRP cluster instances. It should be noted that the session replication server 812 is in data communication with the active clustered ESRP 808a and all standby clusters. This ensures that if the active clustered ESRP 808a fails or is otherwise unavailable, the standby cluster may resume communications for an existing session.

In the example shown in FIG. 8, the active clustered ESRP 808a includes two tenants, a first tenant 814a and a second tenant 814b. Each tenant includes a cluster of three ESRP cluster nodes. It will be appreciated that a clustered ESRP may include one or more tenants and each tenant may feature a cluster of two or more ESRP cluster nodes. The ESRP cluster nodes may be similar to the ESRP cluster node 260 shown in FIG. 4.

From the perspective of a cluster manager, a tenant is the network element rather than a downstream entity such as a PSAP. The cluster manager may be configured to run as a single instance for all tenants. The cluster manager, as discussed above, supports multiple domains to map URI to IP address for DNS. Cluster management modules may be configured to support multi-tenants per software module based on configuration information.

The policy manager associated with the cluster manager 810 may be configured to maintain ESRP cluster node states. The state information can include: CPU load, memory utilization, system heat, queue and element thresholds/state, node status, preference(s), and/or configuration thresholds. The policy manager may include a SIP user agent (UA) to process queue state information and entity state information to generate the call distribution policy. The policy manager may also be configured to use the SIP UA for heartbeat processing and normalization. The policy manager, in some implementations, is configured to generate a call distribution scheme, such as based on policies described, for example, in reference to FIG. 3, and to provide the call distribution scheme to the SIP call load balancer.

The nodes may be configured to replicate and exchange information via replicated message and node database (DB) 820. The messages may be replicated via message queues such as RabbitMQ, a commercially available open-source software package from Pivotal Software, Inc. The node database 820 may be similar to the node database 265 shown in FIG. 2.

The cluster manager configuration may also be maintained in the replicated message and node database 820. The cluster manager 810 is configured to manage the ESRP cluster nodes states by receiving heartbeat information from the nodes on a periodic basis. The information may be received, in some implementations, via SIP options ping messaging. The absence of a heartbeat may be interpreted as the node being unavailable. Policy management may cause an adjustment to the call distribution policy based on the change detected in ESRP cluster node availability. The availability management framework 806a may be configured to restart an unavailable node.

The SIP UA associated with the active policy manager may be configured to inspect SIP packets in the load balancer and use session replication server 812 to replicate the SIP events to standby instances. When the active instance is unavailable, the SIP UA associated with the standby cluster manager may be configured to inject the SIP event to the load balancer associated with the standby instance to reconstruct the SIP call session. The SIP UA on the standby instance will be configured to use the same address (e.g., IP address; MAC address) as the original event. To ensure proper handling of the SIP call session, the addressing will be maintained on both legs of the SIP session (e.g., to and from).

The availability management framework 806a may transmit a message to the first standby instance 808b indicating it will become active. The availability management framework 806a may also attempt to restart the unavailable cluster manager (e.g., the previously active instance 808a). If instance 808a is successfully restarted, it will come online as a standby instance. The newly active instance 808b upon receiving the activation message, may be configured to dynamically set its addressing information to the virtual IP address and MAC address of the previous active instance 808a.

In the implementation shown in FIG. 8, each ESRP cluster (e.g., tenant) is configured to register with the upstream devices via a HTTP proxy. The HTTP proxy is implemented in FIG. 8 by a webserver (web srv) included in the cluster manager 810. As discussed, the cluster manager 810 receives registration information from the ESRP cluster nodes and sends a single registration message to upstream devices. The single message is generated based on the information received from each of the nodes and cluster policy information. Downstream devices also register with the cluster manager HTTP proxy. The cluster manager 810 is configured to select an ESRP cluster node to receive the registration message. The selection may be based on a configuration, node information, or a sequence (e.g., round robin). The selected ESRP cluster node processes the registration message and saves the state in the replicated message and node database 820 such that all ESRP cluster nodes have access to the registration information.

In the implementation shown in FIG. 8, downstream devices send notify SIP events to the SIP call load balancer included in the cluster manager 810. The SIP call load balancer is configured to send these to the SIP UA associated with the policy manager. The SIP UA may be configured to select an ESRP cluster node to process the notification and the PRF in the node will set the state in the replicated message and node database 820 for access by all ESRP cluster nodes in the cluster for the selected node.

The SIP instances in the ESRP cluster nodes are configured to send SIP events via a proxy service. In some implementations, the proxy service may be provided by the cluster manager 810. The SIP call load balancer included in the cluster manager 810 receives subscribe events and transmits the event data to the SIP UA in the proxy manager. The proxy manager, in turn, will determine if the subscription information needs to be sent out based on the subscription data and previous message transmitted to the downstream devices. If the determination is made that the information should be transmitted, the proxy manager sends the subscription information to the downstream device via the SIP call load balancer.

Subscriptions received from the upstream devices may also be sent to the SIP call load balancer. The SIP call load balancer will send the subscribe message to the policy manager SIP UA. The SIP UA is configured to load balance and send the subscription to an ESRP cluster node node for processing. The selection may be based on node load, node state, or other property of the node and/or cluster. The policy routing function included in the selected ESRP cluster node will then set the state in the database 820 which can be read by all other ESRP cluster nodes. A similar process for subscriptions sent from the cluster to the downstream devices may be implemented. A policy routing function for an ESRP cluster node may be configured to send a subscribe event to the SIP call load balancer which in turn forwards the event information to the SIP UA. The SIP UA may normalize the event information along with other event information received from nodes included in the cluster to one subscribe event for downstream transmission.

SIP instances for ESRP on the nodes may be configured to use a SIP proxy setting to route SIP events through for upstream traffic. The SIP proxy may be implemented as part of the cluster manager for upstream traffic. SIP events excluding subscribe/notify/options ping may be distributed to the ESRP cluster nodes for a tenant by the SIP call load balancer using the routing information received from policy manager. The policy manager may generate a list of the distribution nodes for each network element.

The SIP call load balancer may be configured to ensure affinity for the SIP session to an ESRP cluster node for all SIP transactions within the session. SIP traffic upstream and downstream will traverse through the SIP call load balancer to/from the cluster. This may be achieved by configuring the SIP call load balancer as a SIP proxy for each of the ESRP cluster nodes, and setting the DNS domain/SRV entries to the SIP call load balancer. The SIP call load balancer may be configured as a forwarding engine for SIP traffic and only consume options/subscribe/notify events to the policy manager SIP UA. Accordingly, the SIP call load balancer may be configured to selectively process traffic based on the traffic event type. If processed by the SIP call load balancer, the traffic may be consumed (e.g., routed no further). In some implementations, the traffic may be diverted or converted based on the traffic event type.

Heartbeats information may be processed similar to the subscription or notification information discussed above. The policy manager may be configured to determine, based on the configured policy, if heartbeats for the cluster should be sent or not. The SIP UA in the policy manager may receive heartbeats from each ESRP cluster node in the cluster. The heartbeat information may be stored in the database for further processing (e.g., determining whether the heartbeat should be sent).

To achieve high-availability, when a cluster manager fails or is otherwise unavailable, availability management framework 804 may detect the failure and select one of the standby instances to become the active instance. Detection may be based on one or more of network connectivity to the active instance, heartbeat information received (or not received) from the active instance, availability of a service hosted by the active instance, and the like. The selected standby instance will become the active instance and assume the identity (e.g., IP address; MAC address) of the previously active instance. All active SIP sessions and ESRP cluster node affinity will be available on the standby instance because session information will be shared via the session replication 812 and the replicated messaging and node database 820. To upstream and downstream devices, communication traffic will continue to appear normal (e.g., as if processed by the original, now unavailable, instance).

In some implementations, node heath alerts may be supported. The health events may remain in the message queue until processed by a node. When switching instances, the newly active cluster manager may be configured to continue processing from a replicated message queue. The cluster managers read configuration data from a local instance of the replicated messaging and node database 820.

The term "substantially" as used herein is a broad term, and is to be given its ordinary and customary meaning to a person of ordinary skill in the art (and is not to be limited to a special or customized meaning), and refers without limitation to being largely but not necessarily wholly that which is specified, which may include an amount greater than 50 percent, an amount greater than 60 percent, an amount greater than 70 percent, an amount greater than 80 percent, an amount greater than 90 percent or more.

The terms "processor" and "processor module," as used herein are a broad terms, and are to be given their ordinary and customary meaning to a person of ordinary skill in the art (and are not to be limited to a special or customized meaning), and refer without limitation to a computer system, state machine, processor, or the like designed to perform arithmetic or logic operations using logic circuitry that responds to and processes the basic instructions that drive a computer. In some embodiments, the terms can include ROM and/or RAM associated therewith.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "message" encompasses a wide variety of formats for transmitting information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed/transmitted/stored/received/etc. in multiple parts.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an electronic device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an electronic device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention, e.g., as including any combination of the listed items, including single members (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Headings are included herein for reference and to aid in locating various sections. These headings are not intended to limit the scope of the concepts described with respect thereto. Such concepts may have applicability throughout the entire specification.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. An emergency services routing proxy device, the device including:
   a first emergency services routing proxy node and a second emergency services routing proxy node, the first emergency services routing proxy node and the second emergency services routing proxy node configured to route calls to a downstream entity, the calls received from an upstream entity; and
   a cluster manager configured to:

receive first registration information from the first emergency services routing proxy node, the first registration information including a routing service identifier, the routing service identifier associated with a first tenant of the first emergency services routing proxy node;

receive a second routing service identifier from the first emergency services routing proxy node, the second routing service identifier associated with a second tenant of the first emergency services routing proxy node;

receive second registration information from the second emergency services routing proxy node, the second registration information including the routing service identifier;

provide a service status message for a routing service associated with the routing service identifier; and identify the first emergency services routing proxy node or the second emergency services proxy node to provide the routing service for a call, the identifying based on:
  a service identifier included in the call;
  the first registration information; and
  the second registration information.

2. The device of claim 1, wherein the downstream entity includes at least one of another emergency services routing proxy or a public safety answering point.

3. The device of claim 1, wherein the call is a session initiation protocol call.

4. The device of claim 1, wherein the routing service identifier and the identifier included in the call include a uniform resource identifier (URI).

5. The device of claim 1, wherein the upstream entity includes at least one of a call originating device or another emergency services routing proxy.

6. The device of claim 1, further comprising a load balancer coupled with the cluster manager, the load balancer configured to identify a node based on a load balancing policy, wherein the cluster manager is further configured to identify the first emergency services routing proxy node or the second emergency services proxy node via the load balancer.

7. The device of claim 6, further comprising:
a first database server associated with the first emergency services routing proxy node, the first database server including routing policy data; and
a second database server associated with the second emergency services routing proxy node, the second database server including the routing policy data,
wherein the first database server and the second database server are configured to replicate routing policy data such that the routing policy data included in database servers is identical.

8. The device of claim 1, wherein the cluster manager providing the service status message is further configured to:
receive node status information from nodes associated with the routing service identifier, the nodes including the first emergency services routing proxy node and the second emergency services routing proxy node;
generate the service status message based on the received node status information and a status policy; and
transmit the service status message to the upstream entity.

9. The device of claim 8, wherein the node status information includes at least one of node load, a number of active calls for the node, node memory usage, node network bandwidth, and node routing time.

10. The device of claim 9, wherein the status policy associates a service status with aggregated node status information values, and wherein the service status message includes the service status.

11. The device of claim 1 further comprising:
a first manager database server configured to store the registration information;
a second cluster manager; and
a second manager database server associated with the second cluster manager and configured to store the first registration information and the second registration information,
wherein the first manager database server and the second manager database server are configured for mutual replication, and
wherein the second cluster manager is configured to replace the cluster manager upon detecting a failure of the cluster manager.

12. A method of emergency services call routing, the method comprising:
receiving, at an electronic device including a cluster management processor, first registration information from a first emergency services routing proxy node, the first registration information including a routing service identifier, the routing service identifier associated with a first tenant of the first emergency services routing proxy node;
receiving a second routing service identifier from the first emergency services routing proxy node, the second routing service identifier associated with a second tenant of the first emergency services routing proxy node;
receiving second registration information from a second emergency service routing proxy node, the second registration information including the routing service identifier;
providing a service status message for a routing service associated with the routing service identifier;
receiving a call including a service identifier; and
identifying the first emergency services routing proxy node or the second emergency services proxy node to provide the routing service for the call, the identifying based on:
  the service identifier included in the call;
  the first registration information; and
  the second registration information.

13. The method of claim 12, further comprising providing the call to the identified one of the first emergency services routing proxy node or the second emergency services proxy node.

14. The method of claim 12, wherein the call is a session initiation protocol call.

15. The method of claim 12, wherein the routing service identifier comprises a uniform resource identifier (URI).

16. The method of claim 12, wherein identifying the first emergency services routing proxy node or the second emergency services proxy node to provide the routing service for the call comprises:
receiving a load balancing policy;
receiving node information from one or more of the first emergency services routing proxy node and the second emergency services proxy node; and
identifying the first emergency services routing proxy node or the second emergency services proxy node further based on the load balancing policy and the received node information.

17. The method of claim 12, wherein providing the service status message includes:
  receiving node status information from nodes associated with the routing service identifier, the nodes including the first emergency services routing proxy node and the second emergency services routing proxy node;
  generating the service status message based on the received node status information and a status policy; and
  transmitting the service status message to an upstream entity.

18. The method of claim 12, wherein emergency services routing nodes associated with the routing service identifier are each configured to route the call to the same downstream entity.

19. An emergency services routing proxy device, the device including:
  a plurality of means for routing calls to a downstream entity, the calls received from an upstream entity;
  means for receiving registration information from said plurality of means for routing calls, wherein registration information for a first means for routing calls includes a routing service identifier and a second routing service identifier, and wherein registration information for a second means for routing calls includes the routing service identifier, the routing service identifier associated with a first tenant of the first means for routing calls, the second routing service identifier associated with a second tenant of the first means for routing calls;
  means for providing a service status message for a routing service associated with the routing service identifier; and
  means for identifying one of the plurality of means for routing calls to provide the routing service for a call, the identifying based a service identifier included in the call and the registration information received from said plurality of means for routing calls.

* * * * *